June 12, 1951   G. H. SNYDER   2,556,666
HYDRAULIC TRANSMISSION
Filed March 23, 1948   4 Sheets-Sheet 2
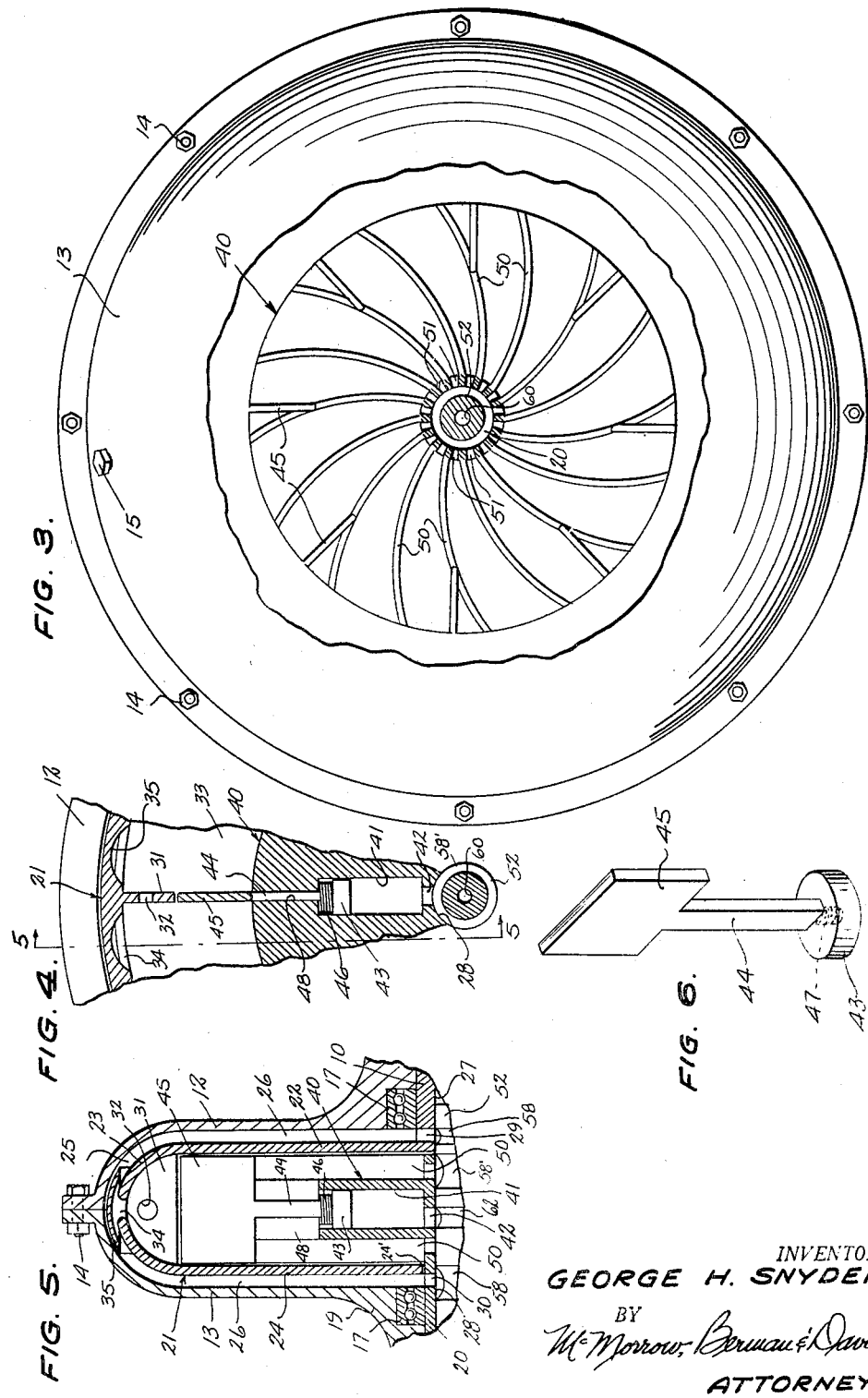
INVENTOR.
GEORGE H. SNYDER,
BY
McMorrow, Berman & Davidson
ATTORNEYS, June 12, 1951 — G. H. SNYDER — 2,556,666

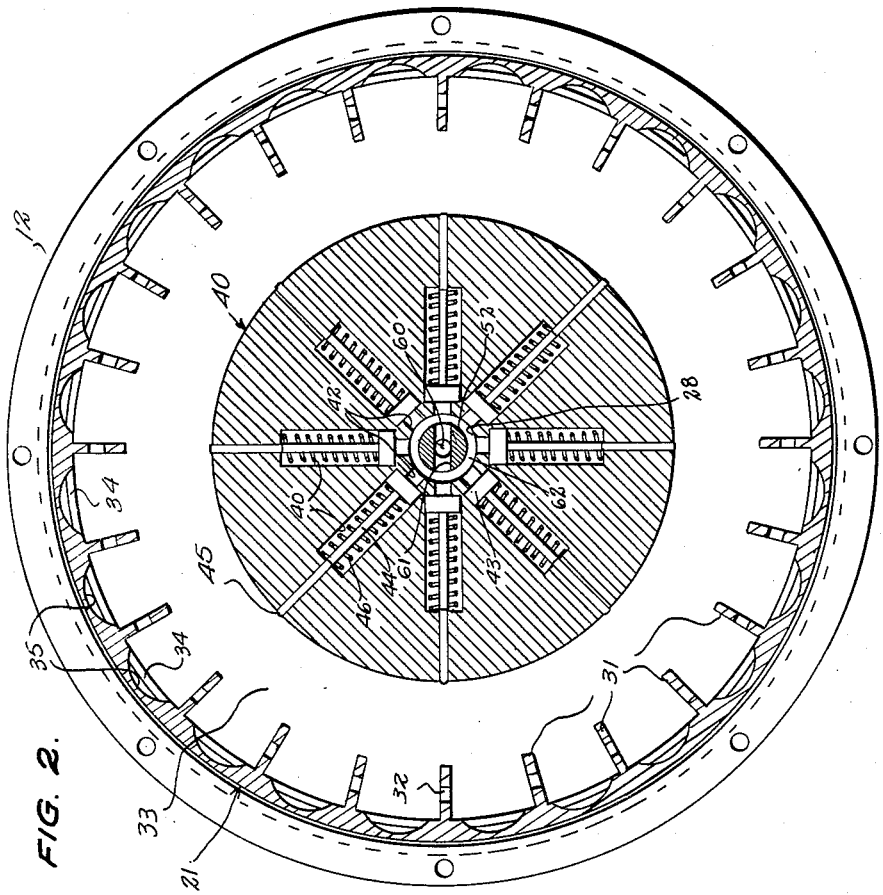

HYDRAULIC TRANSMISSION

Filed March 23, 1948 — 4 Sheets-Sheet 3

INVENTOR.
GEORGE H. SNYDER,
BY
McMorrow, Berman & Davidson
ATTORNEYS.

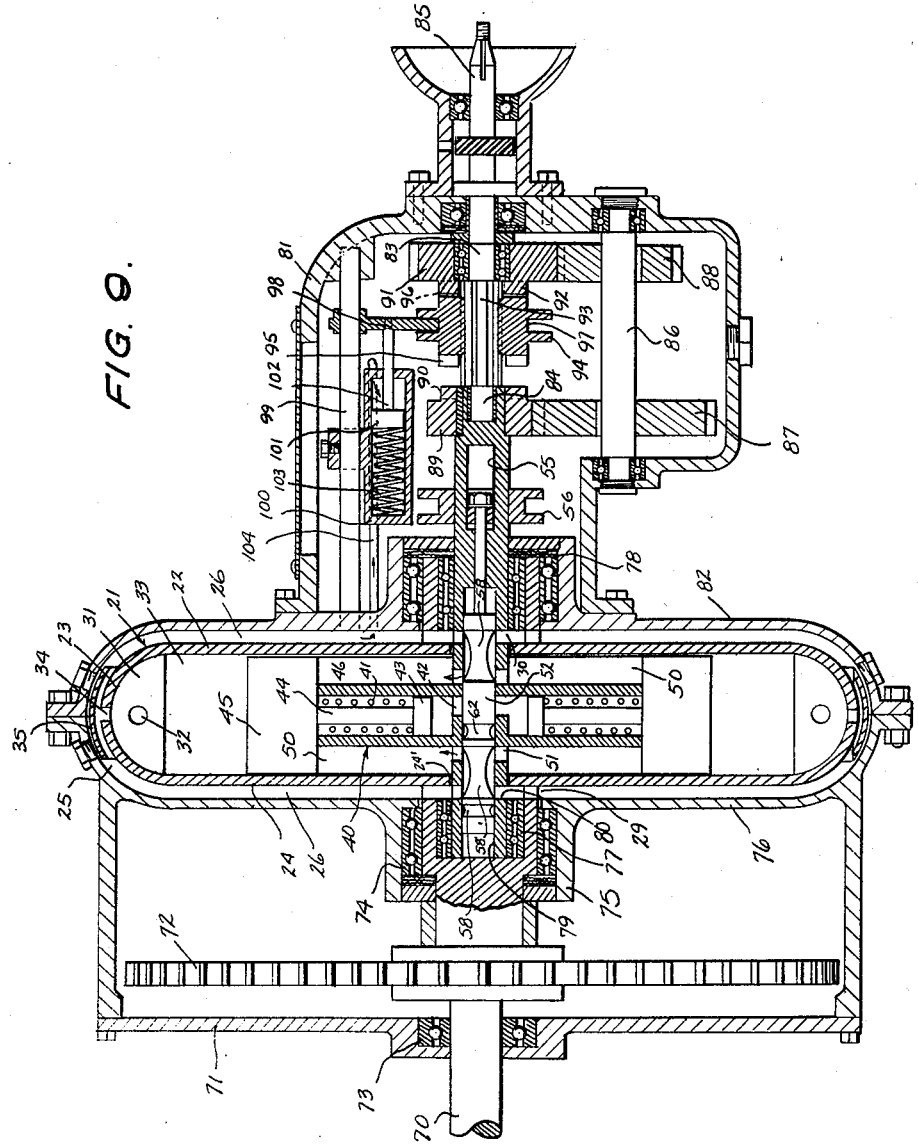

Patented June 12, 1951

2,556,666

UNITED STATES PATENT OFFICE 2,556,666

HYDRAULIC TRANSMISSION

George H. Snyder, Toledo, Ohio

Application March 23, 1948, Serial No. 16,605

7 Claims. (Cl. 74—732)

My invention relates to means for transmitting power hydraulically from a drive to a driven shaft, and relates more particularly to the transmission of power from the hydraulic coupling interposed between an internal combustion engine and the running gear of a motor vehicle. Obviously, the device of the invention is not so limited, however. Specifically, the invention relates to a hydraulic coupling wherein a body of hydraulic driving fluid is confined in a hollow driving rotor within a stationary housing, and which driving rotor is adapted to be rotated by the drive shaft of the engine. Rotation of such rotor creates centrifugal force which positions the body of hydraulic fluid in an annularly-shaped formation against the peripheral wall of the rotor. A driven rotor is positioned concentrically within the driving rotor and provided with vanes projectible into and out of the annularly-shaped formation of rotating hydraulic fluid, whereby to couple the driving rotor to the driven rotor.

With the foregoing in view, it is an object of my invention to provide an improved hydraulic transmission of the class described.

A further object of the invention is to provide an improved hydraulic transmission of the class described which includes means for selectively reversing the direction of rotation of the driven rotor without reversing the direction of rotation of the driving rotor.

A further object is to provide an improved hydraulic transmission of the class described together with means automatically coupling the driven shaft to a load at a reduction gear ratio during initial rotation of the driven shaft, and thereafter automatically coupling the driven shaft directly to the load when the speed of rotation of the driving rotor reaches a predetermined rate.

A further object is to provide a novel transfer case for a hydraulic transmission which includes means for automatically connecting a driven shaft to a take-off shaft by either reduction gearing or by a direct connection in accordance with the speed of rotation of the driving rotor.

A further object is to provide an improved hydraulic transmission which includes means for selectively operating a driven shaft in opposite directions without reversing the direction of rotation of the drive shaft, and which includes novel valve means for controlling the direction of rotation of the driven shaft.

Other objects and advantages reside in the particular structure of the invention, the structure of the elements forming the same, combination and arrangement of the several elements thereof, and/or in the particular method or mode of operation, all of which will be readily apparent to those skilled in the art upon reference to the attached drawings in connection with the following specification, wherein the invention is shown, described and claimed.

In the drawings:

Figure 1 is a longitudinal vertical section through a preferred form of the transmission according to the invention;

Figure 2 is a transverse vertical section of the same;

Figure 3 is an elevational view of the same, parts being broken away to show interior parts more clearly;

Figure 4 is an enlarged fragmentary vertical sectional view taken substantially on the plane of the line 4—4 of Figure 1;

Figure 5 is a vertical sectional view taken substantially on the plane of the line 5—5 of Figure 4;

Figure 6 is an enlarged perspective view showing a detail apart from the rest of the structure;

Figure 9 is a longitudinal vertical sectional view like Figure 1, but showing a slightly modified structure of the invention.

Figure 7:
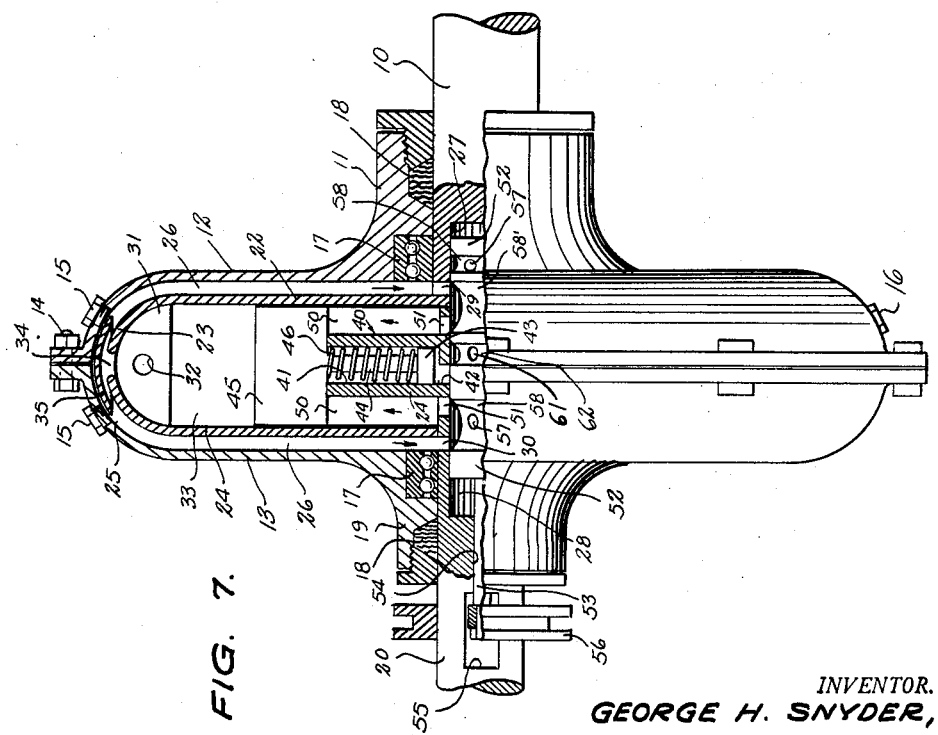
Figure 7 is an end elevational view, parts being broken away and shown in longitudinal vertical section and showing certain of the parts in a different position from that shown in Figure 1.

Referring more specifically to the drawings, wherein like reference characters have been used throughout the several views to designate like parts, and referring particularly to that form of the invention illustrated in Figures 1 to 8, inclusive, 10 designates any suitable drive shaft adapted to be rotated by any suitable source of power, not shown. The drive shaft 10 is journaled in a hub 11 of a housing-providing member 12 which is secured to an opposed and complementary housing-providing member 13 by any suitable means 14 extending through peripherally-disposed flanges thereof. Such members 12 and 13 are provided with plugs 15 at the upper ends to permit the introduction of fluid to the interior of the housing, and at least one of the housings may be provided with a suitable drain plug 16.

The shaft 10 is journaled in the hub 11 for rotation relative thereto by any suitable bearing means 17, and any suitable packing 18 is provided to form a fluid-tight joint about the shaft 10. The housing-providing member 13 is likewise provided with a hub 19 in which is journaled a driven shaft 20. The driven shaft 20 is journaled for rotation relative to the housing 12 and 13 by any suitable bearings 17, and suitable packing 18 provides a fluid-tight seal along such driven shaft. It is to be understood that the housing formed by the members 12 and 13 is fixed to any suitable support, not shown, such as the frame of an automobile. The driven shaft 20 is connected to any suitable load, such as the running gear, not shown, of the automobile.

The drive shaft 10 has fixed on the inner end or formed on the inner end a driving rotor 21 which comprises a closed casing having a radially outwardly-directed web 22 which merges into a preferably concavo-convex, circumferential wall 23, which, in turn, merges into an inwardly-directed web 24 parallel to the web 22. The inner ends of the web 24 are journaled on the driven shaft 20, as at 24', and provide a fluid-tight joint therewith. Although no means are shown for providing such fluid-tight joint, it is understood that any suitable packing and/or like means is to be provided. The driving rotor 21 is spaced from the housing 12, 13, both laterally and peripherally, whereby to provide a pair of lateral spaces 26 and a peripheral space 25 therebetween. The drive shaft 10 is provided with an axial bore 27, while the inner end of the driven shaft 20 is likewise provided with an axial bore 28. Such bores 27 and 28 are preferably of the same diameter and shape and are coaxial. The drive shaft 10 is provided with a plurality of intake ports 29 extending therethrough and communicating with the bore 27. In like manner, the driven shaft 20 is provided with a plurality of intake ports 30 communicating with the bore 28 thereof. Thus, fluid in the lateral spaces 26 may be passed therefrom into the bores 28 and 27 of the shafts.

The peripheral wall 23 of the driving rotor 21 is provided with a plurality of radially inwardly-directed and fixed baffles 31, each of which is formed with an opening 32 therethrough. The baffles 31 are circumferentially spaced around the rotor 21 and extend inwardly a relatively short distance to provide a space 33 axially inwardly thereof. The peripheral wall is likewise provided with a plurality of discharge ports 34 between adjacent baffles 31 which discharge into the peripheral space 25 of the housing. The outer surface of the peripheral wall 23 is provided with a plurality of concave fixed baffles 35 which direct fluid passing through the ports 34 laterally in both directions into the lateral spaces 26 of the housing. In this connection, it should be noted that the driving rotor 21 is adapted to contain a body of hydraulic driving fluid, not shown. Upon rotation of the driving rotor with the drive shaft 10, such body of fluid assumes an annular formation against the peripheral wall 23 and extends into the space 33 aforesaid. The openings 32 in the baffles 31 serve to equalize pressure in the fluid, while the baffles 31 cause the fluid to rotate with the driving rotor 21. Obviously, the centrifugal force generated causes portions of the body of fluid to escape through the discharge ports 34 outwardly of the driving rotor. The baffles 35 direct the escaping fluid laterally in both directions into the spaces 26 and to the intake ports 29 and 30 in the driving and driven shafts 10 and 20, respectively.

The driven shaft 20 has fixed on the end thereof a driven rotor which is generally indicated by 40, and which includes a central web formed with a plurality of radially outwardly-extending cylinders 41. The cylinders 41 communicate with the bore 28 of the driven shaft 20 by forward ports 42. A piston 43 is slidable in each cylinder 41 and includes an outwardly-directed stem 44 terminating in a vane 45. The stem 44 may be detachably connected to the piston 43 by any suitable means, such as the threaded connection 47, Figure 6. Likewise, the stem 44 is preferably of angular configuration, whereby to prevent turning of the same in the slot 48 which slidably receives the stem and the vanes 45. A coil spring 46 is positioned in each cylinder 41 and is concentrically disposed about the stem 44. One end of each spring 46 bears on the outer surface of the piston 43, while the opposite end bears against the closed outer end of the cylinder, whereby the piston 43 is loaded for radial inward movement toward the port 42. With the transmission parts at rest, the springs 46 retract the pistons 43 and vanes 35 to the innermost limit of the cylinders 41, as shown in Figure 1. In this position, the outer end edges of the vanes 45 are flush with the outer periphery of the driven rotor 40, and no rotation is imparted to the driven rotor 40 upon initial rotation of the driving rotor 21. However, upon continued rotation of the driving rotor 21, driving fluid is forced through the ports 29 and 30 into the bore 28 of the driven shaft 20, and from there radially outwardly through the forward ports 42 into the cylinders 41. Continued rotation drives the pistons 43 radially outwardly and into the space 33 between the outer periphery of the driven rotor and the inner edges of the baffles 31. The faster the driving rotor is rotated, the further the vanes 45 are projected outwardly until they reach a limit of outward travel best seen in Figures 4 and 5, wherein the outer edges of the vanes 45 are just clear of the inner edges of the fixed baffles 31. Continued rotation of the driving rotor, together with the fluid body contained therein, is effective to operatively couple the driving rotor to the driven rotor in a well known manner. Thus, rotation is imparted to the driven shaft 20 in the same direction as that in which the drive shaft 10 is rotating. Likewise, there is a direct relation between the speed of rotation of the driving rotor and that imparted to the driven rotor. For instance, with the driving rotor rotating at relatively low speeds, substantially little pressure will be exerted on the pistons 43, whereby the vanes 45 are projected but a short distance into the space 33. Thus, a less powerful coupling is achieved and the speed of rotation of the driven shaft 20 is relatively slow. However, upon maximum speeds and with the vanes 45 fully projected, a substantially direct coupling is achieved, whereby the driving and driven rotors, together with their shafts, are rotating at substantially the same speed.

Figure 8:
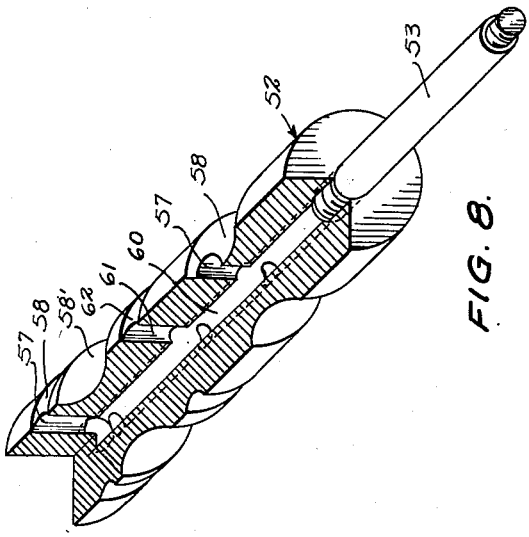
Figure 8 is an enlarged perspective view, parts being broken away and shown in section, of an element of the invention apart from the rest of the structure.

As so far described, the driven rotor is capable of rotation only in the same direction as that of the driving rotor. However, means now to be described permit reversing of the driven rotor and its related shaft without reversing the direction of rotation of the driving rotor and drive shaft. Such reverse movement is accomplished by providing a plurality of radially-extending and laterally oppositely-directed reversing vanes 50, Figure 3, on opposite sides of the web providing the cylinders for the driving rotor 40. Such vanes 50 diverge radially outwardly in a well known manner and may be curved to achieve the most desirable results, as shown in Figure 3. The driven shaft 20 is provided with a plurality of radially outwardly-directed reversing ports 51 which provide communication between the bore 28 of the driven shaft and the interstices between each reversing blade 50. Obviously, it is desirable to maintain the reversing ports 51 closed while the forward ports 42 are open, and vice versa. To accomplish this purpose, I have provided a slide valve 52 which is slidable in the aligned bores 28 and 27 of the driving and driven shafts 10 and 20, respectively. Such slide valve 52 is best illustrated in Figure 8, and comprises a stem 53 which extends axially outwardly of the bore 28 in a counterbore 54 of the driven shaft 20. Such counterbore terminates in a cross-slot 55 in the driven shaft to permit coupling of the stem 53 of the valve to a collar 56 in a well known manner. The collar 56 is provided with an annular groove for connection to any suitable actuating yoke, not shown. Thus, the slide valve 52 may be reciprocated in the aligned bores 27 and 28, while the shafts are rotating or relatively rotating.

The valve 52 is cylindrical in form and has a close fit in the aligned bores aforesaid. Likewise, the end portions of the valve are provided with longitudinally-spaced annular grooves 58, each of which has formed in the floor thereof a radially inwardly-directed inlet port 57. Such ports open into a longitudinally-extending bore 60 formed in the valve 52. Intermediate the grooves 58, the periphery of the valve 52 is formed with a second and smaller groove 62 into the floor of which opens an outlet port 61 which establishes communication between the groove 62 and the bore 60 of the valve. An additional annular groove 58' is formed in the valve 52 between one of the grooves 58 and the groove 62 for a purpose to be described.

Figure 1 shows the valve 52 disposed for forward movement of the driven rotor 40, and in this position, the grooves 58 are disposed below the inlet ports 29 and 30 in the drive shaft 10 and the driven shaft 20, respectively. Likewise, the intermediate groove 62 is aligned with the forward ports 42 opening into the cylinders 41. Thus, fluid forced down the lateral spaces 26 passes through the ports 29 and 30, into the grooves 58 and ports 57 of the valve along the axial bore 60 thereof and outwardly through the discharge ports 61 into the cylinders 41, whereby to actuate the pistons 43 and the vanes 45, as previously described. When it is desired to cause the driven rotor 40 to rotate in a direction opposite to that of the direction of rotation of the driving rotor, the valve 52 is moved to the position shown in Figure 7. In this position, the left-hand end groove 58 and the groove 58' of the valve 52 bridge the ports 29 and 30 and the adjacent reversing ports 51. At the same time, the intermediate groove 62 is moved out of registry with the forward ports 42, whereby the pistons 43 remain retracted. Meanwhile, fluid under pressure passing through the reversing ports 51 engages the reversing vanes 50 and is effective to rotate the driven rotor 40 in a direction opposite to the direction of rotation of driving rotor 21. After clearing reversing vanes 50, the fluid is discharged radially outwardly into space 33 and rejoins the rotating annular body of fluid contained therein.

Referring now to Figure 9, a slightly modified structure is there disclosed. However, it is to be understood that the driving and driven rotors 21 and 40, respectively, are the same as previously described. In this construction, a drive shaft 70 is connected to a suitable source of power, not shown, and is journaled, as at 73, in a wall of a housing 71. The housing 71 may contain a flywheel 72 fixed to the shaft 70. An inner end of the shaft 70 is journaled, as at 74, in a hub 75 of a fixed housing 76 which corresponds to the fixed housing 12, 13 of the first-described form of invention. The inner end of the drive shaft 70 is fixed to the driving rotor 31, and such inner end is provided with an axial bore receiving a bearing 77 of any suitable form to provide a journaled connection with the free end of a driven shaft 78. The driven shaft 78 is provided with an axial bore 79 in which the slide valve 52 is slidable, as previously described. However, in view of the fact that the driven shaft 78 is telescoped within the inner end of the drive shaft 70, an additional intake port 80 is provided to align with the intake port 29 of the drive shaft. Fluid is circulated through the device, and the direction of rotation of the driven rotor 40 is controlled in the same manner as in the first-described form of the invention. The outer end of the driven shaft 78 extends into a transfer case 81 which is fixed to the housing-providing portion 82 substantially concentrically of the driven shaft. The transfer case 81 has journaled therein a take-off shaft 83 which is preferably axially aligned with the driven shaft 78. Preferably, an inner end 84 is telescopically received in a recess formed in the outer end of the driven shaft 78 to provide a journal. The outer end 85 of the take-off shaft 83 extends outwardly of the transfer case 81 and is adapted for connection to any suitable load, not shown. The transfer case 81 contains a counter-shaft 86, the ends of which are journaled in the transfer case in any suitable bearings. The counter-shaft 86 has fixed thereon in spaced relation a pair of speed-reducing gears 87 and 88. A pinion 89 is fixed on the end of the driven shaft 78 for rotation therewith and is in constant mesh with the reduction gear 87. The outer end surface of the pinion 89 is formed to provide clutch teeth 90 for a purpose to be described later. Outwardly of the pinion 89, an idler pinion 91 is journaled for free rotation on the take-off shaft 83 by any suitable bearings. The inner lateral face of the idler pinion 91 is provided with clutch teeth 92. The idler gear 91 is in constant mesh with the second reduction gear 88. Intermediate the pinions 89 and 91, the take-off shaft 83 is splined longitudinally, as at 93, for slidable and rotatable engagement with a double-faced clutch member 94. The clutch member 94 is a double-faced clutch member provided with laterally inwardly and outwardly-directed clutch teeth 95 and 96, respectively, which are complementary to the clutch teeth 90 and 92, respectively, of the driven pinion 89 and idler pinion 91. The clutch 94 rotates with the take-off shaft 83. The outer periphery of the clutch 94 is formed with an annular groove 97 for engagement with a yoke 98 adapted to slide the clutch 94 backward and forward on the splined portion 93 of the take-off shaft 83. The upper end of the yoke 98 is slidable on a guide 99 which extends longitudinally of the transfer case 81 in parallel relation to the shafts 78 and 83. The guide 99 likewise supports in fixed relation thereto a cylinder 100 in which is slidable a piston 101. The piston 101 includes a stem 102 which extends through an end wall of the cylinder 100 and is fixedly connected in any suitable manner to the yoke 98. Inasmuch as the cylinder 100 is parallel to the shafts 78 and 83, actuation of the piston 101 will serve to actuate the clutch 94 in opposite directions on the splined portion 93 of the take-off shaft 83. A spring 103 is positioned in the cylinder 100 between the inner end surface of the piston 101 and the inner end of the cylinder. Thus, the piston 101 and the clutch 94 are normally positioned outwardly under the load of the spring 103 so that the outer clutch teeth 96 of the clutch are operatively engaged with the inwardly-directed clutch teeth 92 of the idler pinion 91. Thus, with the driven rotor 40 actuating as previously described, power is transmitted to the take-off shaft 83 through the driven shaft 78, driven pinion 89, reduction pinions 87 and 88, the idler pinion 91, clutch 94, splines 93 to the take-off shaft 83. Obviously, by virtue of the reduction gearing, substantially little power is required to turn the take-off shaft 83 with this arrangement. Thus, the initial actuation of the driven rotor is relatively easy. To engage the inner clutch teeth 95 of the clutch 94 with the driven pinion 89, there has been provided a pressure conduit 104 which extends from one lateral space 26 in the housing 76, 82 to the outer end of the cylinder 100. Thus, when sufficient fluid pressure has been generated in such space 26, fluid under pressure passes through the conduit 104 to the outer end of the cylinder 100 and moves the piston 101 inwardly in such cylinder against the action of the spring 103. Such movement takes with it the yoke 98 and clutch 94, whereby the clutch teeth 95 are engaged with the clutch teeth 90 of the driven pinion 89 after disengagement of the outer clutch teeth 96 from the idler pinion 91. The arrangement thus described provides a direct connection between the driven shaft 78 and the take-off shaft 83. This is obviously the case as the speed-reducing gearing 87 and 88 are now connected only to the idler pinion 91, which, as aforesaid, is freely rotatable on the take-off shaft 83.

The arrangement just described provides means automatically connecting the driven shaft and take-off shaft for direct drive after sufficient speed has been picked up by the driving rotor 21. That is to say, when sufficient speed has been generated by the driving rotor, sufficient pressure will have been generated in the space 26 aforesaid to actuate the piston 101. Moreover, this is true irrespective of whether the valve 52 is positioned for forward or reverse drive.

It is to be understood that the particular forms of the invention shown and described hereinabove are susceptible of changes in arrangement, location of parts, whereby to carry the several functions stated hereinabove. Likewise, while I have shown and described what is now thought to be the preferred embodiments of the invention, it is understood that the same is susceptible of other forms and expressions. Consequently, I do not limit myself to the precise structures shown and described hereinabove, except as hereinafter claimed.

I claim:

1. A hydraulic transmission, comprising a fixed housing, a drive shaft and a driven shaft, said shafts being axially aligned and including adjacent free ends journaled in said housing and extending inwardly thereof, each of said free ends being formed with an axial bore, a hollow driving rotor fixed to said drive shaft inwardly of said housing and spaced therefrom, said rotor being adapted to contain a body of hydraulic driving fluid therein, a driven rotor fixed to said driven shaft inwardly of said driving rotor, said driving rotor being formed with discharge ports discharging radially therefrom into said housing, said free ends of said shafts being formed with intake ports discharging into said bores from said housing, said driven rotor including a plurality of radially-directed cylinders, a piston in each cylinder, a vane fixed to each piston and movable radially therewith into and out of driving engagement with said fluid to couple said driven rotor and shaft to said driving rotor for rotation therewith, laterally-directed fixed reversing vanes on said driven rotor, a slide valve in said bores of said shafts, said bore of said driven shaft including longitudinally-spaced forward and reversing ports discharging respectively to said cylinders and reversing vanes, and means for moving said slide valve to selectively open and close said forward and reversing ports whereby to selectively actuate said driven shaft in opposite directions.

2. A hydraulic transmission, comprising a fixed housing, a drive shaft and a driven shaft, said shafts being axially aligned and including adjacent free ends journaled in said housing and extending inwardly thereof, each of said free ends being formed with an axial bore, a hollow driving rotor fixed to said drive shaft inwardly of said housing and spaced therefrom, said rotor being adapted to contain a body of hydraulic driving fluid therein, a driven rotor fixed to said driven shaft inwardly of said driving rotor, said driving rotor being formed with discharge ports discharging radially therefrom into said housing, said free ends of said shafts being formed with intake ports discharging into said bores from said housing, said driven rotor including a plurality of radially-directed cylinders, a piston in each cylinder, a vane fixed to each piston and movable radially therewith into and out of driving engagement with said fluid to couple said driven rotor and shaft to said driving rotor for rotation therewith, spring means in said cylinders loading said pistons and vanes to retracted positions, laterally-directed fixed reversing vanes on said driven rotor, a slide valve in said bores of said shafts, said bore of said driven shaft including longitudinally-spaced forward and reversing ports discharging respectively to said cylinders and reversing vanes, and means for moving said slide valve to selectively open and close said forward and reversing ports whereby to selectively actuate said driven shaft in opposite directions.

3. A hydraulic transmission, comprising a fixed housing, a drive shaft and a driven shaft, said shafts being axially aligned and including adjacent free ends journaled in said housing and extending inwardly thereof, each of said free ends being formed with an axial bore, a hollow driving rotor fixed to said drive shaft inwardly of said housing and spaced therefrom, laterally and peripherally to provide lateral and peripheral spaces therebetween, said rotor including a peripheral wall formed with a plurality of fixed and relatively short baffles extending radially inwardly thereof within said rotor to define a cylindrical space in said rotor axially thereof, said baffles being formed with openings therein, said rotor being adapted to contain a body of driving fluid therein, said peripheral wall being formed with fluid-discharge ports therein intermediate adjacent baffles, said ports discharging into said peripheral space, a driven rotor fixed to said driven shaft inwardly of said driving rotor in radially inwardly-spaced relation to said baffles, said free ends of said shafts being formed with fluid intake ports discharging into said bores from said lateral spaces, said driven rotor including a plurality of radially-directed cylinders, a piston in each cylinder, a vane fixed to each piston and movable radially therewith toward and away from said baffles for driving engagement with said body of fluid, fixed radially-extending reversing vanes projecting laterally of said driven rotor, forward and reversing ports in said driven shaft for directing fluid from the bore thereof to said cylinders and reversing vanes, respectively, and valve means in said bore of said driven shaft for selectively opening and closing said forward and reversing ports, whereby to actuate said driven shaft selectively in opposite directions.

4. A hydraulic transmission, comprising a fixed housing, a drive shaft and a driven shaft, said shafts being axially aligned and including adjacent free ends journaled in said housing and extending inwardly thereof, each of said free ends being formed with an axial bore, a hollow driving rotor fixed to said drive shaft inwardly of said housing and spaced therefrom, laterally and peripherally to provide lateral and peripheral spaces therebetween, said rotor including a peripheral wall formed with a plurality of fixed and relatively short baffles extending radially inwardly thereof within said rotor to define a cylindrical space in said rotor axially thereof, said baffles being formed with openings therein, said rotor being adapted to contain a body of driving fluid therein, said peripheral wall being formed with fluid-discharge ports therein intermediate adjacent baffles, said ports discharging into said peripheral space, baffles fixed to said wall outwardly thereof and directing fluid from said ports laterally therefrom in opposite directions toward said lateral spaces, a driven rotor fixed to said driven shaft inwardly of said driving rotor in radially inwardly-spaced relation to said baffles, said free ends of said shafts being formed with fluid intake ports discharging into said bores from said lateral spaces, said driven rotor including a plurality of radially-directed cylinders, a piston in each cylinder, a vane fixed to each piston and movable radially therewith toward and away from said baffles for driving engagement with said body of fluid, fixed radially-extending reversing vanes projecting laterally of said driven rotor, forward and reversing ports in said driven shaft for directing fluid from the bore thereof to said cylinders and reversing vanes, respectively, and valve means in said bore of said driven shaft for selectively opening and closing said forward and reversing ports, whereby to actuate said driven shaft selectively in opposite directions.

5. A hydraulic transmission, comprising a fixed housing, a drive shaft and a driven shaft journaled in said housing, a hollow driving rotor fixed to said drive shaft inwardly of said housing, said rotor being adapted to contain a body of hydraulic driving fluid therein, a driven rotor fixed to said driven shaft inwardly of said driving rotor, said driving rotor being formed with at least one discharge port opening into said housing and adapted to discharge fluid into said housing by centrifugal force upon rotation of said driving rotor, said driven rotor including a plurality of radially-directed cylinders, a piston in each cylinder, a vane fixed to each piston and movable radially therewith into and out of driving engagement with said fluid to couple said driven rotor and shaft to said driving rotor for rotation therewith, fixed reversing vanes on said driven rotor, at least one of said shafts being formed with an intake port opening into said housing and separate forward and reverse discharge ports in communication with said inlet port and discharging respectively into said cylinders and into said reversing vanes, and means for selectively opening and closing said discharge ports whereby to actuate said driven rotor selectively in opposite directions.

6. A hydraulic transmission, comprising a fixed housing, a drive shaft and a driven shaft journaled in said housing, a hollow driving rotor fixed to said drive shaft inwardly of said housing, said rotor being adapted to contain a body of hydraulic driving fluid therein, a driven rotor fixed to said driven shaft inwardly of said driving rotor, said driving rotor being formed with at least one discharge port opening into said housing and adapted to discharge fluid into said housing by centrifugal force upon rotation of said driving rotor, said driven rotor including a plurality of radially-directed cylinders, a piston in each cylinder, a vane fixed to each piston and movable radially therewith into and out of driving engagement with said fluid to couple said driven rotor and shaft to said driving rotor for rotation therewith, spring means in said cylinders loading said pistons and vanes to retracted positions wherein said vanes are out of driving engagement with said fluid, laterally-directed fixed reversing vanes on said driven rotor, at least one of said shafts being formed with an intake port opening into said housing and separate forward and reversing discharge ports in communication with said inlet port and discharging respectively into said cylinders and to said reversing vanes, and means for selectively opening and closing said discharge ports whereby to actuate said driven rotor selectively in opposite directions.

7. The combination including a relatively stationary housing containing a fluid, driving and driven rotors rotatably mounted within the housing and coupled together through the fluid, the fluid creating a pressure within the housing proportional to the speed of rotation of the driving rotor, a driven shaft connected with the driven rotor for rotation therewith and including a driving gear, a separate power take-off shaft rotatably supported near the driven shaft, an idler gear freely rotatably mounted upon the power take-off shaft, a shiftable clutch element connected with the power take-off shaft for rotation therewith and engageable with the driving gear and idler gear, a countershaft freely rotatably supported near the driven and power take-off shafts, first and second reduction gears secured to the countershaft for rotation therewith and meshing with the drive and idler gears respectively, a cylinder disposed near the power take-off shaft and connected with the housing and having an opening, there being a discharge opening in the housing, conduit means connecting the opening of the housing with the opening of the cylinder, piston means mounted within the cylinder and connected with the clutch element for shifting the same into engagement with either of the driving or idler gears, and resilient means connected with the piston means for shifting it in a direction to hold the clutch element in engagement with the idler gear, the piston means and clutch element shifting against the action of the spring means when the fluid within the housing creates a predetermined pressure so that the clutch will engage the driving gear for coupling the driven and power take-off shafts directly.

GEORGE H. SNYDER.

REFERENCES CITED

The following references are of record in the file of this patent:

UNITED STATES PATENTS

| Number | Name | Date |
|---|---|---|
| 895,491 | Nash | Aug. 11, 1908 |
| 1,095,132 | Thomson | Apr. 28, 1914 |
| 2,006,136 | Grimsley | June 25, 1935 |
| 2,212,772 | Guyer | Aug. 27, 1940 |
| 2,400,186 | Armentrout | Mar. 14, 1946 |